United States Patent
Hwang et al.

(10) Patent No.: US 8,228,399 B2
(45) Date of Patent: Jul. 24, 2012

(54) CAMERA AND METHOD AND APPARATUS FOR PROVIDING PHOTOGRAPHING GUIDE INFORMATION

(75) Inventors: Young-kyoo Hwang, Seoul (KR); Jung-Bae Kim, Hwaseong-di (KR); Jong-ha Lee, Hwaseong-gun (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 345 days.

(21) Appl. No.: 12/453,062

(22) Filed: Apr. 28, 2009

(65) Prior Publication Data

US 2009/0268058 A1 Oct. 29, 2009

(30) Foreign Application Priority Data

Apr. 29, 2008 (KR) .................. 10-2008-0039885

(51) Int. Cl.
*H04N 5/76* (2006.01)
*H04N 5/262* (2006.01)
*H04N 3/14* (2006.01)
*H04N 5/335* (2011.01)

(52) U.S. Cl. ......... 348/231.99; 348/333.02; 348/333.03; 348/333.12; 348/239

(58) Field of Classification Search . 348/333.01–333.04
See application file for complete search history.

(56) References Cited

U.S. PATENT DOCUMENTS

| | | | | |
|---|---|---|---|---|
| 6,806,906 | B1* | 10/2004 | Soga et al. | 348/333.03 |
| 6,987,535 | B1* | 1/2006 | Matsugu et al. | 348/239 |
| 7,317,485 | B1* | 1/2008 | Miyake et al. | 348/333.02 |
| 7,321,391 | B2* | 1/2008 | Ishige | 348/239 |
| 7,321,393 | B2* | 1/2008 | Kim | 348/333.03 |
| 7,349,020 | B2* | 3/2008 | Stavely et al. | 348/333.02 |
| 7,432,973 | B2* | 10/2008 | Iga | 348/333.03 |
| 7,551,211 | B2* | 6/2009 | Taguchi et al. | 348/239 |
| 7,855,737 | B2* | 12/2010 | Petrescu et al. | 348/239 |
| 7,899,208 | B2* | 3/2011 | Kondo et al. | 382/103 |
| 7,912,245 | B2* | 3/2011 | Steinberg et al. | 382/103 |
| 7,952,618 | B2* | 5/2011 | Kawada | 348/239 |
| 2004/0012702 | A1* | 1/2004 | Ishige | 348/333.12 |

FOREIGN PATENT DOCUMENTS

| | | |
|---|---|---|
| JP | 2004-314907 | 11/2004 |
| KR | 10-2004-0047876 | 6/2004 |
| WO | 2004/006566 A1 | 1/2004 |

* cited by examiner

*Primary Examiner* — Jason Chan
*Assistant Examiner* — Pritham Prabhakher
(74) *Attorney, Agent, or Firm* — Staas & Halsey LLP (57) ABSTRACT

A camera, and a method and apparatus for providing photographing guide information are provided. The camera extracts first scene information expressing features of a first scene that a user intends to photograph when a user input requesting scene setup is received. The camera extracts second scene information expressing features of a second scene that is captured in a photographing standby state. The camera uses the first scene information and the second scene information to generate guide information for guiding a photographer capturing the second scene to photograph the first scene, and providing the guide information to the display.

17 Claims, 6 Drawing Sheets

CAMERA AND METHOD AND APPARATUS FOR PROVIDING PHOTOGRAPHING GUIDE INFORMATION

CROSS-REFERENCE TO RELATED APPLICATIONS

This application claims the benefit under 35 U.S.C. §119 (a) of Korean Patent Application No. 10-2008-0039885, filed on Apr. 29, 2008, the disclosure of which is incorporated herein in its entirety by reference.

BACKGROUND

1. Field

One or more embodiments within the following description relate to a camera that photographs an object and stores acquired image data, and more particularly, to a camera, and a method and apparatus of providing photographing guide information.

2. Description of the Related Art

Photography using digital cameras is increasing due to the increasing popularity of digital cameras and the greater availability of leisure time. However, if a camera user intends to photograph himself or herself, the user must bring along and use a tripod with the camera. If the user does not have a tripod or a similar apparatus, the user must ask another person to take the photograph. However, when the photograph is taken by a person other than the user, the difference in the photographer's position and point of view from the user's makes it difficult to photograph the user with the background and composition originally intended by the user.

SUMMARY

One or more exemplary embodiments within the following description relate to a camera performing a function of guiding another person to a background and a composition desired by a user when the user asks the person to take a photograph, and method of providing photographing guide information.

According to one or more exemplary embodiments, a camera includes: a photographing unit for acquiring an image of an object; a display for displaying the image acquired by the photographing unit; a user interface for receiving user input; a storage for storing images acquired by the photographing unit; and a controller for, when a user input requesting scene setup is received, extracting first scene information expressing features of a first scene that a user intends to photograph and that is displayed on the display, extracting second scene information expressing features of a second scene that is captured in a photographing standby state, using the first scene information and the second scene information to generate guide information for guiding a photographer capturing the second scene to photograph the first scene, and providing the guide information to the display.

According to one or more exemplary embodiments, a method of providing photographing guide information in a camera includes: setting up a first scene that a camera user intends to photograph; extracting first scene information expressing features of the set-up scene; extracting second scene information expressing features of a scene captured in a photographing standby state; and using the first scene information and the second scene information to generate guide information for guiding a photographer capturing the second scene to photograph the first scene and providing the guide information using the camera.

According to another exemplary aspect, an apparatus of providing photographing guide information includes: a controller to extract first scene information expressing features of a first scene that is set up according to a user input requesting scene setting and a user intends to photograph, extract second scene information expressing features of a second scene that is captured in a photographing standby state, and generate guide information for guiding a photographer capturing the second scene to photograph the first scene, using the first scene information and the second scene information; and a display to display the guide information thereon.

Additional aspects and/or advantages will be set forth in the description which follows, and in part will be apparent from the description, or may be learned by practice of the embodiments.

It is to be understood that both the foregoing general description and the following detailed description are exemplary and explanatory and are intended to provide further explanation of the embodiments as claimed.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
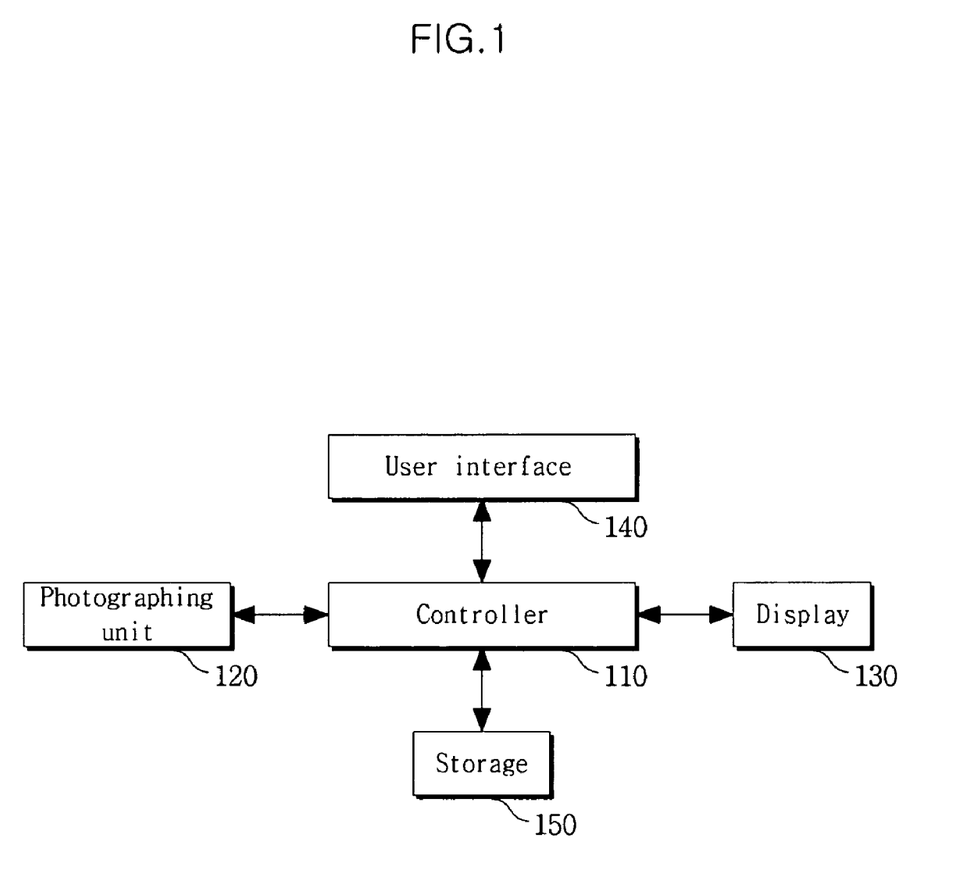
FIG. 1 is a block diagram showing the structure of a camera providing guidance to photograph a scene intended by a user according to an exemplary embodiment.

FIG. 1 is a block diagram showing the structure of a camera providing guidance to photograph a scene intended by a user according to an exemplary embodiment.

A camera 100 may include, for example, a controller 110, a photographing unit 120, a display 130, a user interface 140, and a storage 150.

The controller 110 controls the whole camera 100 by controlling the photographing unit 120, the display 130, the user interface 140, and the storage 150. The controller 110 may include an image processor processing images acquired from the photographing unit 120. Also, the controller 110 performs an operation of controlling elements included in the camera 100 for performing a function of guiding a photographer to photograph a scene intended by a user according to an exemplary embodiment.

The photographing unit 120 includes an image sensor such as a lens, a charge-coupled device (CCD) and a complementary metal-oxide semiconductor (CMOS) image sensor, and modules such as an analog to digital converter, and acquires an image signal generated by capturing an object, converts it into a digital signal, and transmits it to the controller 110. The controller 110 performs image processing operations such as noise removal from the image converted into a digital signal, and color management. Images processed in the controller 110 are stored in the storage 150.

The display 130 includes a display device such as a color liquid crystal display (LCD). The display 130 may display an image of an object captured by the photographing unit 120 in a photographing standby mode, and read and display an image stored in the storage 150 in a playback mode, under control of the controller 110.

The user interface 140 may include various function keys such as a photographing button, a camera operation mode button, and a photographing mode selection button for photographing and displaying images. According to an exemplary embodiment, the user interface 140 may further include a user-intended scene setup button for performing a function for setting up a scene intended by a user. A function performed by the user-intended scene setup button is to provide guidance to others who wish to photograph the user-intended scene. User input signals input through the user interface 140 are transmitted to the controller 110.

According to an exemplary embodiment, when a user input requesting a scene setup is received at the controller 110, through an operation of a user pressing the user-intended scene setup button (not shown) in a photographing standby state of the camera, the controller 110 extracts scene information about a scene displayed on the display 130 and stores the scene information in the storage 150.

According to an exemplary embodiment, the scene information, which expresses features of a scene, includes feature information about at least one interesting point included in the scene.

An interesting point is a point from which stable feature information can be extracted regardless of a change in view or scale, etc. of the scene. In order to extract an interesting point, methods such as Harrison, Hessian corner detection, or difference of Gaussian (DoG) may be employed. Feature information regarding a detected interesting point may be generated by methods such as generalized color moment or scale invariant feature transform (SIFT). Extracted scene information is stored in the storage 150.

When a user-intended scene setup is performed, the camera may return to the photographing standby state. At this time, it is assumed that the user gives the camera to another person, e.g., another photographer, and asks that other person to take a photograph.

In this case, the controller 110 extracts second scene information expressing features of a second scene captured in the photographing standby state, e.g., by the other photographer. An operation of extracting the second scene information from the second scene may be performed in the same way as the operation of extracting the first scene information from the first scene. The controller 110 may read the first scene information from the storage 150, use the first scene information and the second scene information to generate guide information for guiding the other photographer to match the second scene with the first scene, and provide the guide information to the display 130. The guide information may be provided so that it may be superimposed upon the second scene being captured to assist the other photographer in composing the second scene to match the first scene, i.e., the user-intended scene.

While the operation of the controller 110 providing guide information for acquiring the first scene captured through the photographing unit 120 as the first scene may be performed automatically from a photographing standby state after setting up the first scene as described above, the operation of providing guide information may be initiated by another method.

For example, the controller 110 may initiate the providing of guide information after a message confirming whether to provide guide information is displayed to the user and an input requesting the guide information is received. Also, when there are several set-up scenes, the controller 110 may provide guide information after a process of providing a menu screen for selecting a desired set-up scene and the user has selected one scene. The operation of providing guide information may be initiated and performed by any of several different methods.

Since the second scene being captured by the other photographer will vary according to the position of the other photographer and the position in which the other photographer holds the camera, etc., the controller 110 may continuously provide the guide information for matching the changing second scene with the user-intended first scene.

Figure 2:
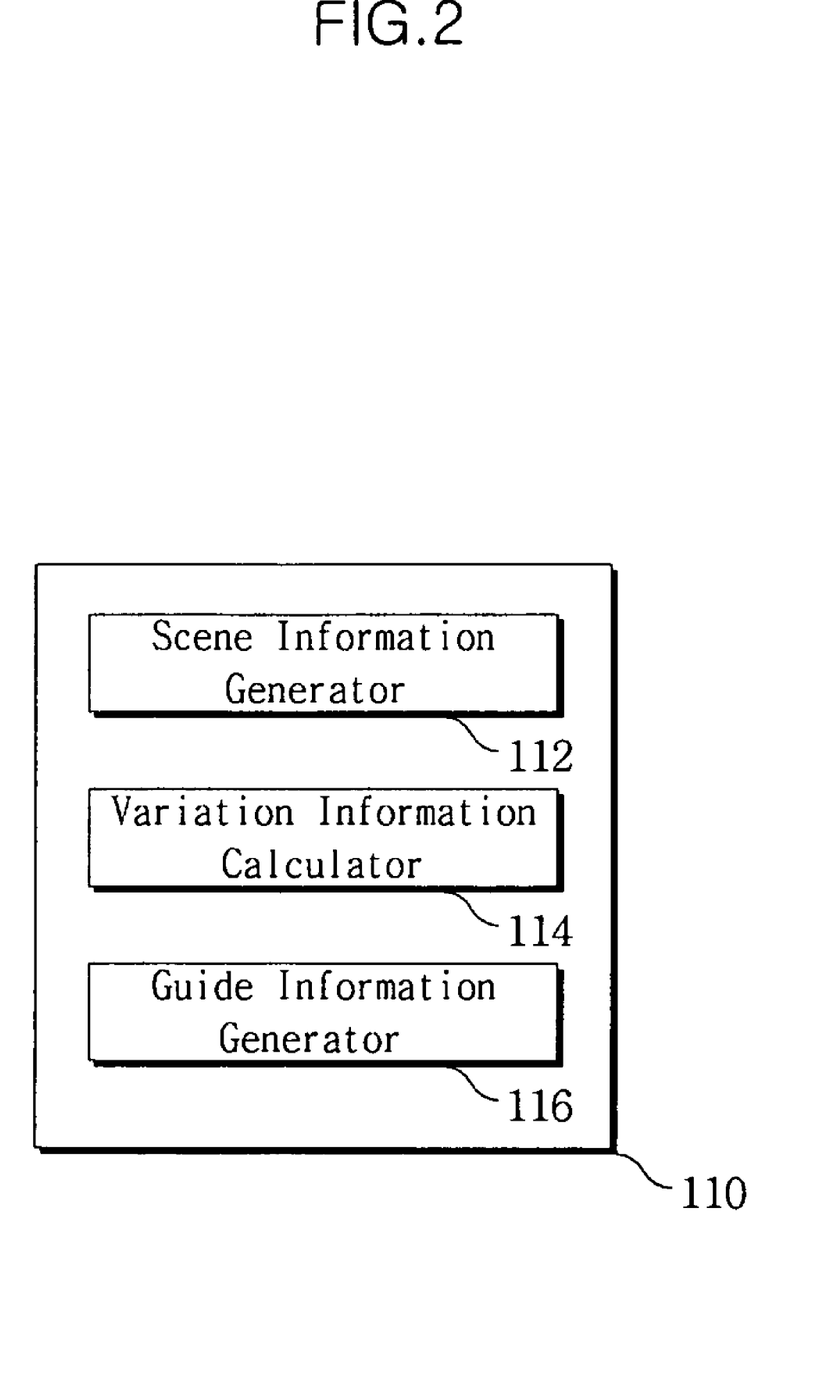
FIG. 2 is a block diagram showing the structure of a control unit included in the camera shown in FIG. 1.

FIG. 2 is a block diagram illustrating the structure of the controller included in the camera shown in FIG. 1.

According to an exemplary embodiment, the controller 110 may include, for example, a scene information generator 112, a variation information calculator 114, and a guide information generator 116.

The scene information generator 112 generates scene information about the first scene, which is the user-intended set-up scene, and one or more second scenes being captured in the photographing standby state. The scene information generator 112 extracts first scene information including at least one first interesting point and feature information about each interesting point from the first scene. The extracted first scene information is stored for calculating variation information with respect to the second scenes at a later stage.

The scene information generator 112 may extract second scene information including at least one second interesting point and feature information about each interesting point from the second scene being acquired after setting up the first scene. Also, the scene information generator 112 may continuously extract second scene information about the second scene which changes with any change in the position of the photographer or position of the camera.

The variation information calculator 114 calculates information on variation between the first scene and the second scenes. The variation information calculator 114 performs point matching on at least one first interesting point and at least one second interesting point, and calculates variation information between the at least one first interesting point and the at least one second interesting point that respectively matches the at least one first interesting point. The variation information calculator 114 may perform point matching using normalized cross correlation (NCC), correlation coefficient, etc.

In addition, the variation information may also be continuously calculated according to the continuous extraction of second scene information about the second scene, which changes according to a change in the photographer's position or in the position of the camera.

The variation information calculator 114 may calculate variation information between first interesting points and respectively corresponding second interesting points that are point-matched using an affine transform. According to an exemplary embodiment, variation information between position information of first interesting points and position information of second interesting points respectively matching the first interesting points is expressed as a matrix and the matrix is estimated by the method of least squares (LS) to calculate the variation information.

The variation information may include information on at least one of a size change, such as enlargement or reduction of corresponding interesting points, displacement, and rotation about a given axis.

The guide information generator 116 generates guide information for guiding a photographer of the second scene to photograph the first scene using the first scene information and the second scene information, and provides the guide information to the display 130. As the variation information changes based on the second scene information, which is continuously extracted as the captured second scene changes, the guide information generator 116 may continuously generate guide information for guiding the photographer of the second scene to photograph a scene matching the first scene.

Specifically, the guide information generator 116 may display guide information for photographing the set-up first scene using the variation information. The guide information may include user-intended scene display information for expressing information about the first scene set up by the user, and photographer scene display information for expressing the second scene captured by the photographer. Also, the user-intended scene display information may be generated using the variation information.

The photographer scene display information may be displayed, for example, as an icon located in the center, or approximately in the center, of the second scene, although other locations within the second scene may also be used. The user-intended scene display information may be an icon created for comparison with the photographer scene display information, whose size and position are determined using the variation information.

The guide information may further include instruction information instructing the photographer how to photograph the user-intended scene. The instruction information may indicate a way to make the icon representing the user-intended scene display information and the icon representing the photographer scene display information match.

The instruction information may include at least one of information indicating which direction the photographer has to move, information indicating a scale adjustment, and information indicating which direction the camera has to be rotated, in order for the photographer to photograph the set-up first scene as intended by the user.

The guide information generator 116 may determine whether a scale can be adjusted by adjusting the position of a lens provided in the photographing unit 120 when scale adjustment is required to make the first scene and the second scene match. When a scale can be adjusted using a zoom-in or zoom-out function of the camera, the guide information generator 116 may control the photographing unit 120 to automatically perform scale adjustment. Otherwise, information about instructions to adjust the scale by moving forward or backward may be provided to the photographer of the second scene.

Figure 3A:
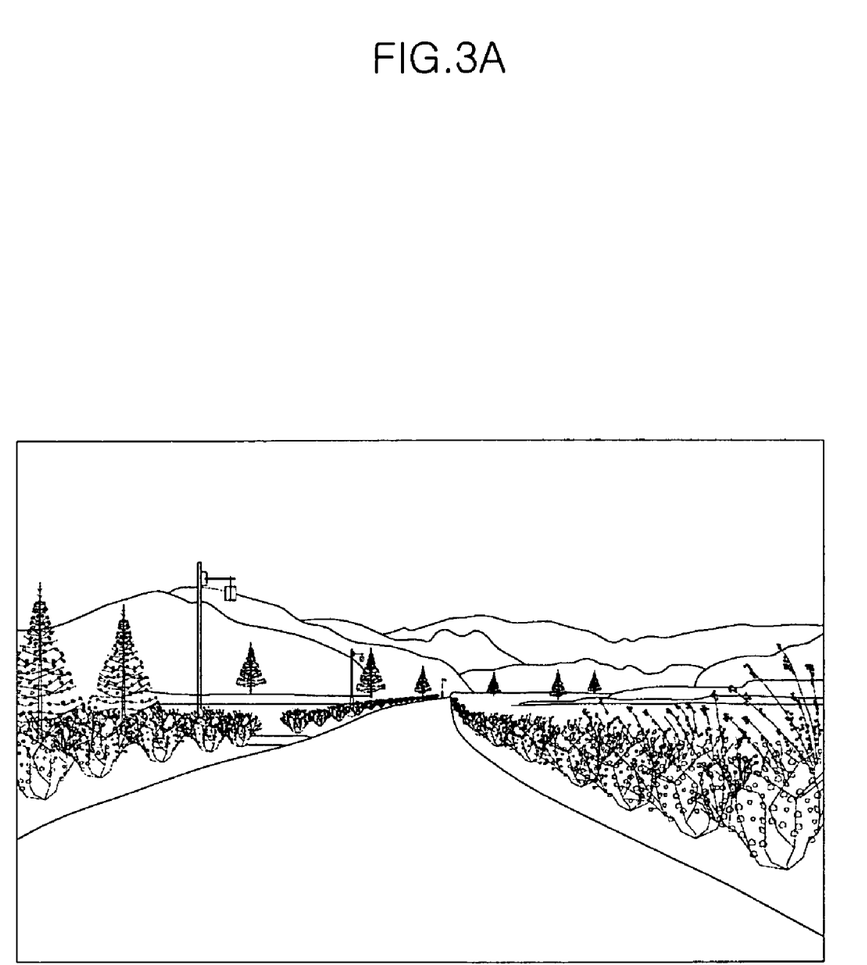
FIG. 3A shows a setup screen and FIG. 3B shows a screen including guide information provided to a photographer according to an exemplary embodiment.
Figure 3B:
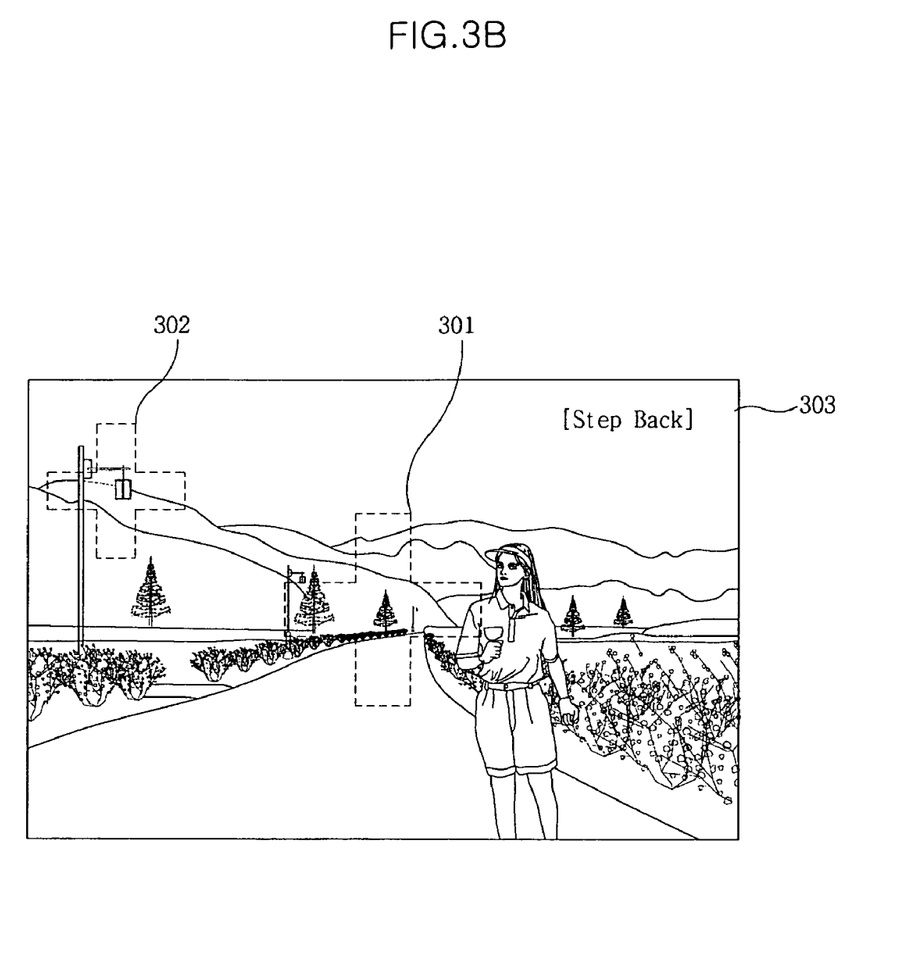

FIG. 3A shows a setup screen and FIG. 3B shows a screen including guide information provided to a photographer according to an exemplary embodiment.

As shown in FIG. 3A, it is assumed that a user-intended setup screen has been set up. Once the user-intended setup screen has been set up, an image that is to be captured by the photographer can be provided as shown in FIG. 3B.

In FIG. 3B, an icon 301 located in the center of the screen provides photographer scene display information, and an icon 302 provides user-intended scene display information. Also, reference numeral 303 is instruction information for instructing the photographer to match the second scene being captured by the photographer with the first scene set up by the user. The instruction information may be displayed in a form such as [STEP BACK] as shown in FIG. 3B.

When the user gives the camera to another person, i.e., the photographer, the photographer may move around and photograph a scene at the moment the icon 301 matches or approximately matches the icon 302. Then, a photograph including the user can be taken with a background, like in FIG. 3A, that is intended by the user.

Figure 4:
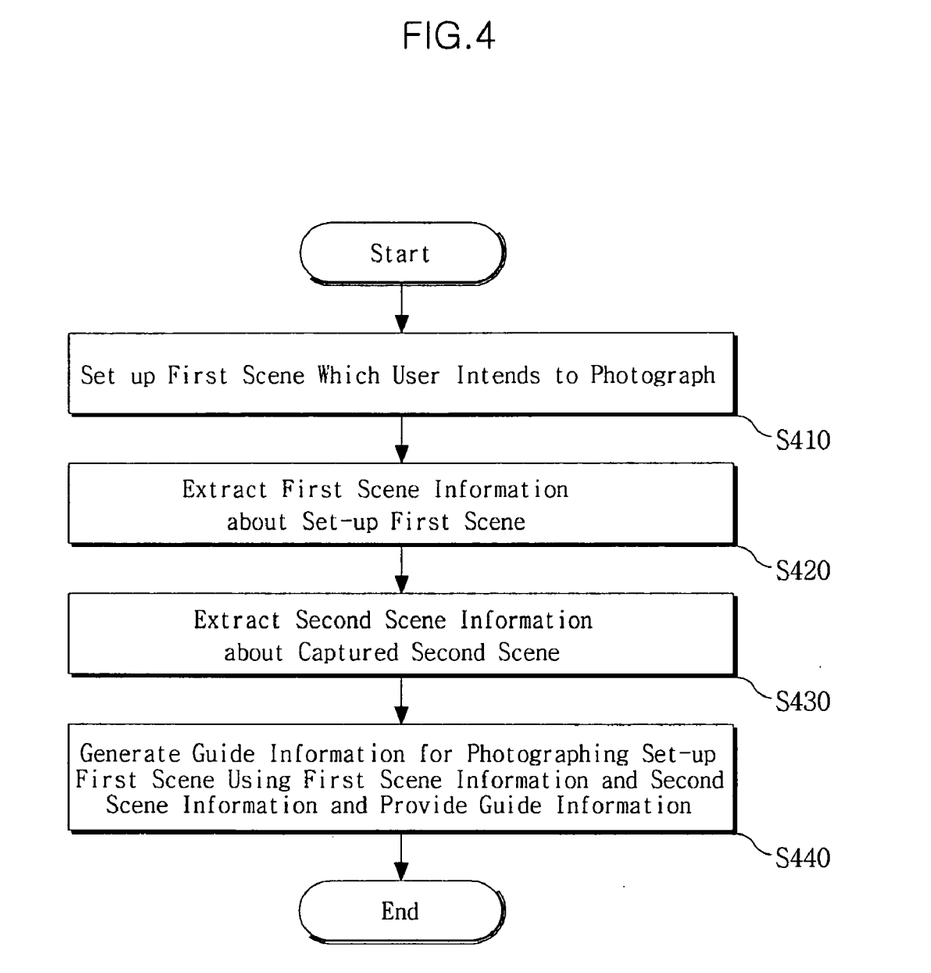
FIG. 4 is a flowchart illustrating a method of providing photographing guide information according to an exemplary embodiment.

FIG. 4 is a flowchart illustrating a method of providing photographing guide information according to an exemplary embodiment.

When a first scene that a user intends to photograph is set up by a method such as pressing a user-intended scene setup button (S410), the camera extracts first scene information about the set-up first scene (S420). The operation of extracting the first scene information may be performed by a method of extracting at least one first interesting point from the first scene, and extracting feature information for each interesting point.

When the user-intended scene is set up, the camera may enter a photographing standby state. The camera extracts second scene information about a scene being captured in the photographing standby state at a different time from when the first scene was set up (S430). The operation of extracting the second scene information may be performed by a method of extracting at least one second interesting point from the second scene, and extracting feature information for each interesting point.

Next, the camera may generate and provide guide information for guiding a photographer capturing the second scene to photograph the set-up first scene, according to the user's intentions, using the first scene information and the second scene information (S440).

Figure 5:
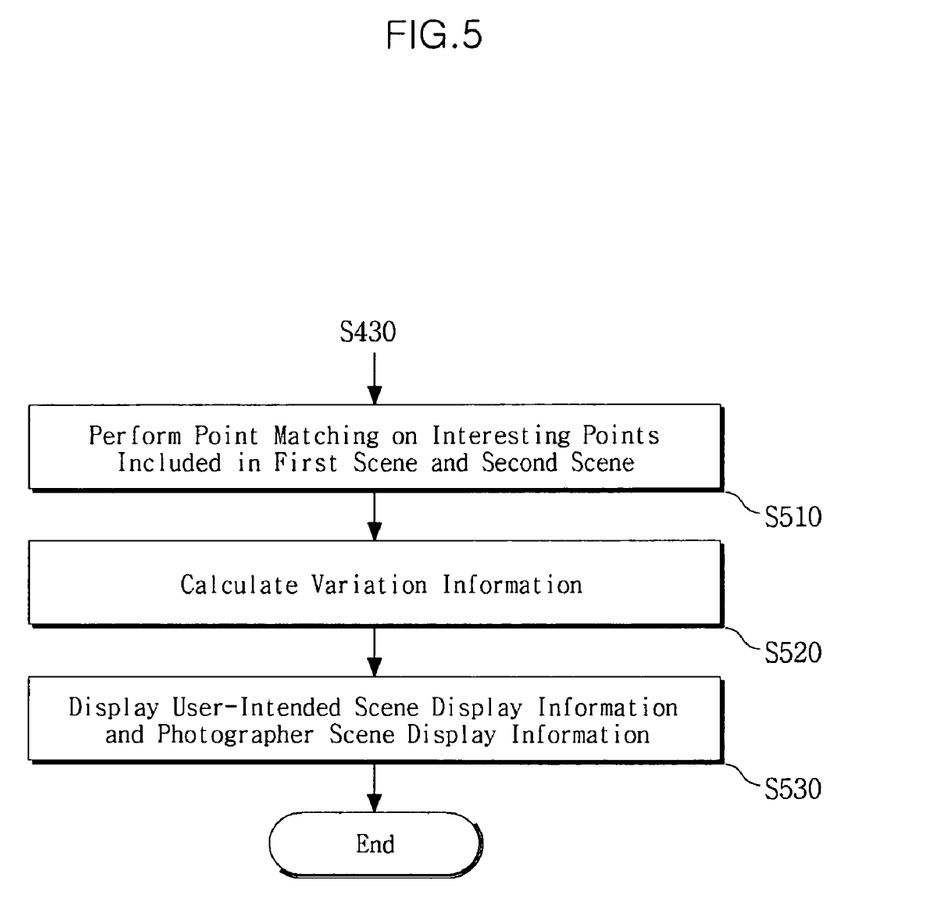
FIG. 5 is a flowchart illustrating in detail a operation of generating and providing guide information shown in FIG. 4.

FIG. 5 is a flowchart illustrating in detail the operation of generating and providing guide information shown in FIG. 4.

In order to perform the guide information providing operation (S440), the camera performs point matching on interesting points respectively included in the each of the first scene and the second scene (S510). Subsequently, the camera calculates variation information between at least one first interesting point from the first scene and at least one second interesting point from the second scene, respectively matching at least one interesting point from each of the first and second scenes (S520).

When the variation information is calculated, the camera may use the variation information to generate and display the guide information for photographing the set-up scene (S530). According to an exemplary embodiment, user-intended scene display information for showing the first scene, and photographer scene display information for showing the photographer's current scene, may be displayed together as guide information superimposed upon the second scene.

According to one or more embodiments, even when a camera user does not have a tripod or other apparatus for taking a photograph that includes himself or herself, a camera having a function of guiding another person to take a photograph having a background and composition desired by the user can be provided.

One or more embodiments can be implemented as computer-readable code stored in or on any form of recording medium to control at least one processing element to implement any of the embodiments described. The computer-readable recording medium includes all types of computer-readable storage media in or on which computer-readable data may be stored. Examples of the computer-readable recording medium include a read-only memory (ROM), a random-access memory (RAM), a compact disc (CD)-ROM, a magnetic tape, a floppy disk, and an optical data storage.

In addition, the computer-readable recording medium may be distributed to computer systems connected via a network in which computer-readable codes may be stored and executed in a distributed manner. The computer readable code may also be transmitted in the form of a carrier wave such as Internet transmission.

Although a few embodiments have been shown and described, it would be appreciated by those skilled in the art that changes may be made in these embodiments without departing from the principles and spirit of the present disclosure, the scope of which is defined in the claims and their equivalents.

What is claimed is:

1. A camera comprising:
    a photographing unit to acquire an image of an object;
    a display to display the image acquired by the photographing unit;
    a user interface to receive user input;
    a storage to store images acquired by the photographing unit; and
    a controller to, when a user input requesting scene setup is received, extract first scene information expressing features of a first scene that a user intends to photograph and that is displayed on the display, extract second scene information expressing features of a second scene that is captured in a photographing standby state, using the first scene information and the second scene information to generate guide information for guiding a photographer capturing the second scene to photograph the first scene, and provide the guide information to the display,
    wherein the first scene information includes at least one first interesting point extracted from the first scene regardless of a change in view and/or scale of the first scene and feature information for each interesting point, and the second scene information includes at least one second interesting point extracted from the second scene regardless of a change in view and/or scale of the second scene and feature information for each interesting point,
    the guide information comprises superimposing at least one feature extracted from the first scene onto a portion of the second scene being captured, and
    the second scene includes areas without superimposed first scene features.

2. The camera of claim 1, wherein the controller continuously performs an operation of generating the guide information to guide the photographer photographing the second scene, which changes according to change in the photographer's position or the camera's position, to photograph the first scene and providing the guide information to the display.

3. The camera of claim 1, wherein the controller performs point matching respectively on the at least one first interesting point and the at least one second interesting point, calculates variation information between the at least one first interesting point and the at least one second interesting point respectively matching the at least one first interesting point, and generates the guide information using the variation information.

4. The camera of claim 3, wherein the variation information represents information on at least one of size change, displacement, and rotation between corresponding interesting points.

5. The camera of claim 3, wherein the guide information includes user-intended scene display information generated using the variation information as information for representing the first scene set up by the user, and photographer scene display information for representing the second scene captured by the photographer, and is displayed on the display together with the captured second scene.

6. The camera of claim 5, wherein the controller generates the photographer scene display information as an icon located approximately in a center of the second scene, generates the user-intended scene display information as an icon displayed for comparison with the photographer scene display information, and the size and position of the icon representing the user-intended scene display information are determined using the variation information.

7. The camera of claim 6, wherein the guide information further includes instruction information instructing the photographer how to photograph the user-intended scene, and the instruction information instructs as to how to make the icon representing the user-intended scene display information match the icon representing the photographer scene display information.

8. The camera of claim 7, wherein the instruction information includes at least one of information indicating which direction the photographer has to move, information indicating scale adjustment, and information indicating which direction the camera has to be rotated, in order for the photographer to photograph the set-up first scene.

9. A method of providing photographing guide information in a camera comprising a processor, the method performed by the processor comprising:
    setting up a first scene that a camera user intends to photograph;
    extracting first scene information expressing features of the set-up first scene;
    extracting second scene information expressing features of a second scene captured in a photographing standby state; and
    using the first scene information and the second scene information to generate guide information for guiding a photographer capturing the second scene to photograph the first scene and providing the guide information using the camera,
    wherein the first scene information includes at least one first interesting point extracted from the first scene regardless of a change in view and/or scale of the first scene and feature information for each interesting point, and the second scene information includes at least one second interesting point extracted from the second scene regardless of a change in view and/or scale of the second scene and feature information for each interesting point,
    the guide information comprises superimposing at least one feature extracted from the first scene onto a portion of the second scene being captured, and
    the second scene includes areas without superimposed first scene features.

10. An apparatus of providing photographing guide information comprising:
    a controller to extract first scene information expressing features of a first scene that is set up according to a user input requesting scene setting and a user intends to photograph, extract second scene information expressing features of a second scene that is captured in a photographing standby state, and generate guide information for guiding a photographer capturing the second scene to photograph the first scene, using the first scene information and the second scene information; and
    a display to display the guide information thereon,
    wherein the first scene information includes at least one first interesting point extracted from the first scene regardless of a change in view and/or scale of the first scene and feature information for each interesting point, and the second scene information includes at least one second interesting point extracted from the second scene regardless of a change in view and/or scale of the second scene and feature information for each interesting point, the guide information comprises superimposing at least one feature extracted from the first scene onto a portion of the second scene being captured, and the second scene includes areas without superimposed first scene features.

11. The apparatus of claim 10, wherein the controller continuously performs an operation of generating the guide information for guiding the photographer photographing the second scene, which changes according to change in the photographer's position or the camera's position, to photograph the first scene and providing the guide information to the display.

12. The apparatus of claim 10, wherein the controller performs point matching respectively on the at least one first interesting point and the at least one second interesting point, calculates variation information between the at least one first interesting point and the at least one second interesting point respectively matching the at least one first interesting point, and generates the guide information using the variation information.

13. The apparatus of claim 12, wherein the variation information represents information on at least one of size change, displacement, and rotation between corresponding interesting points.

14. The apparatus of claim 12, wherein the guide information includes user-intended scene display information generated using the variation information as information for representing the first scene set up by the user, and photographer scene display information for representing the second scene captured by the photographer, and is displayed on the display together with the captured second scene.

15. The apparatus of claim 14, wherein the controller generates the photographer scene display information as an icon located approximately in a center of the second scene, generates the user-intended scene display information as an icon displayed for comparison with the photographer scene display information, and the size and position of the icon representing the user-intended scene display information are determined using the variation information.

16. The apparatus of claim 15, wherein the guide information further includes instruction information instructing the photographer how to photograph the user-intended scene, and the instruction information instructs as to how make the icon representing the user-intended scene display information match the icon representing the photographer scene display information.

17. The apparatus of claim 16, wherein the instruction information includes at least one of information indicating which direction the photographer has to move, information indicating scale adjustment, and information indicating which direction the camera has to be rotated, in order for the photographer to photograph the set-up first scene.

\* \* \* \* \*